Nov. 14, 1961 M. B. MENTLEY 3,008,218
GEAR TOOTH CHAMFERING TOOL
Filed April 22, 1957 3 Sheets-Sheet 1
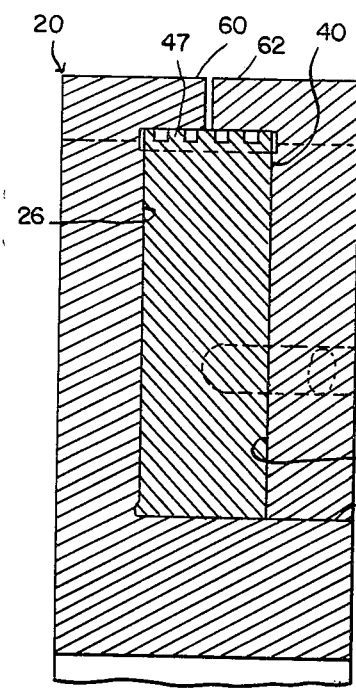
FIG.2.
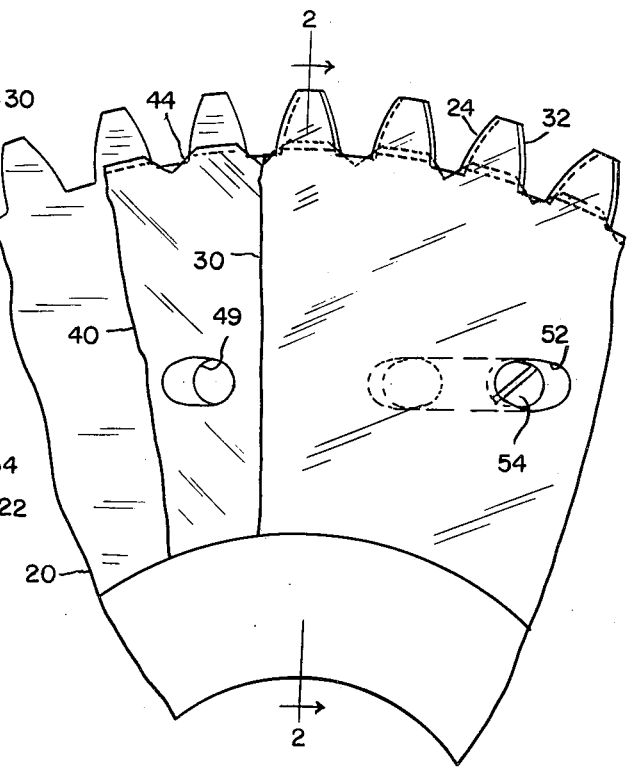
FIG.1.
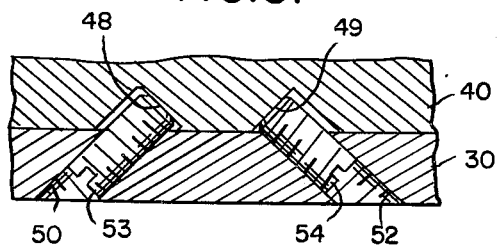
FIG.3.
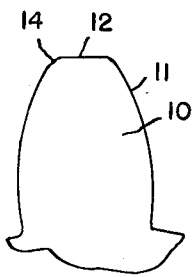
FIG.1.B.
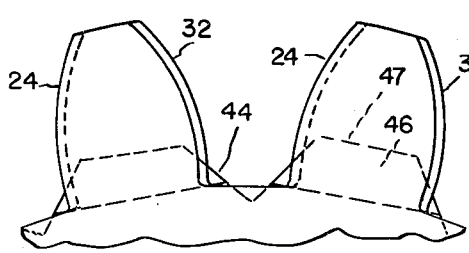
FIG.1A.
INVENTOR.
MAX B. MENTLEY
BY Whittemore,
Hulbert & Belknap
ATTORNEYS

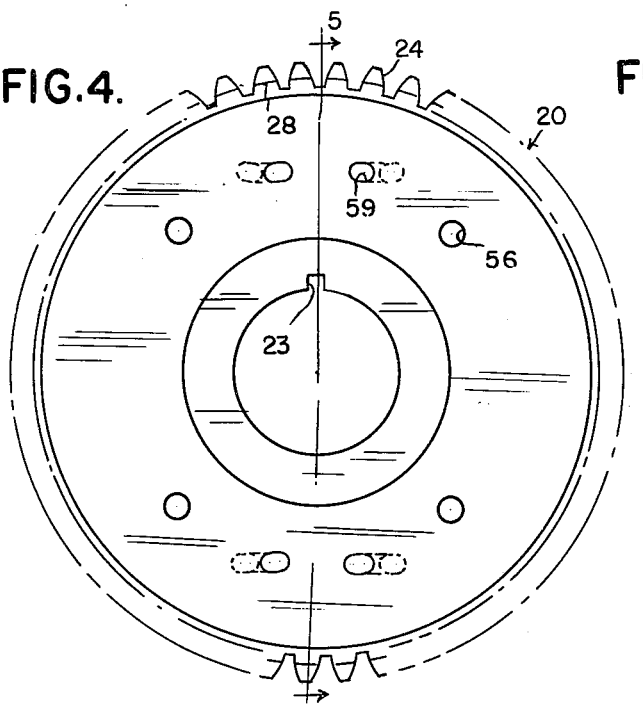
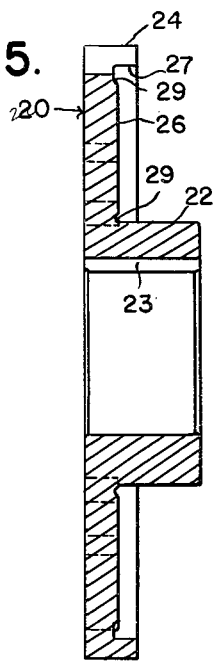
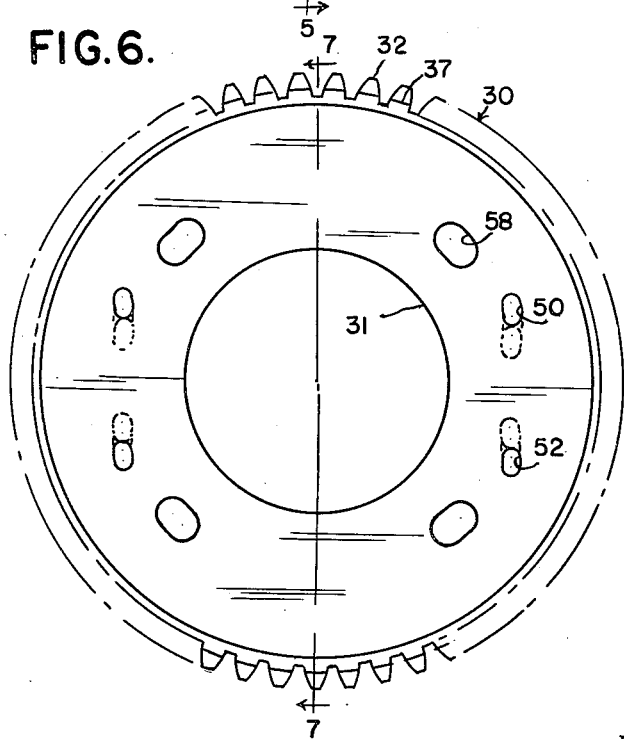
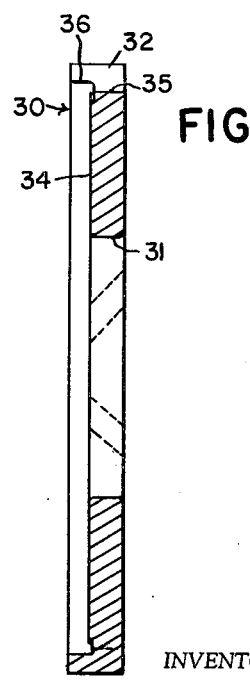

Nov. 14, 1961  M. B. MENTLEY  3,008,218
GEAR TOOTH CHAMFERING TOOL
Filed April 22, 1957  3 Sheets-Sheet 3
FIG.8.
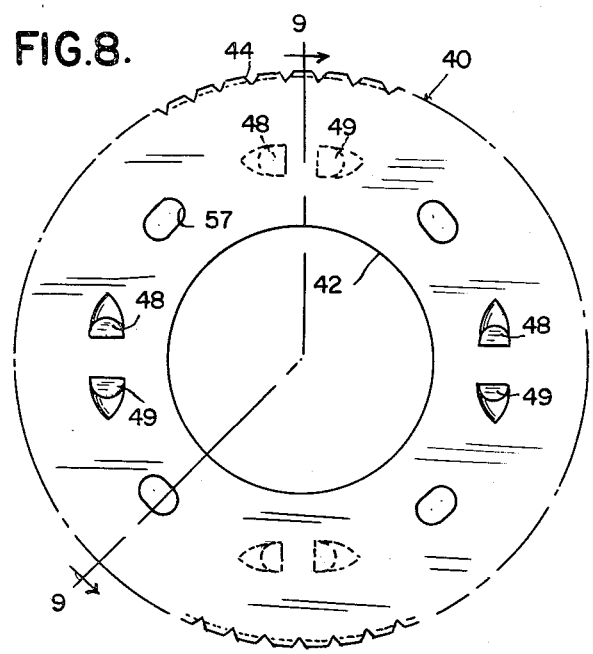
FIG.9.
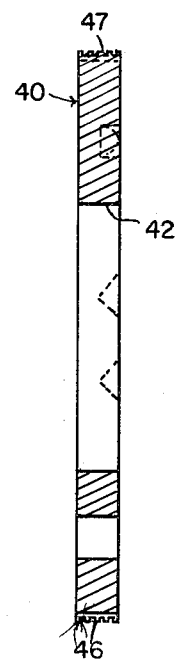
FIG.10.
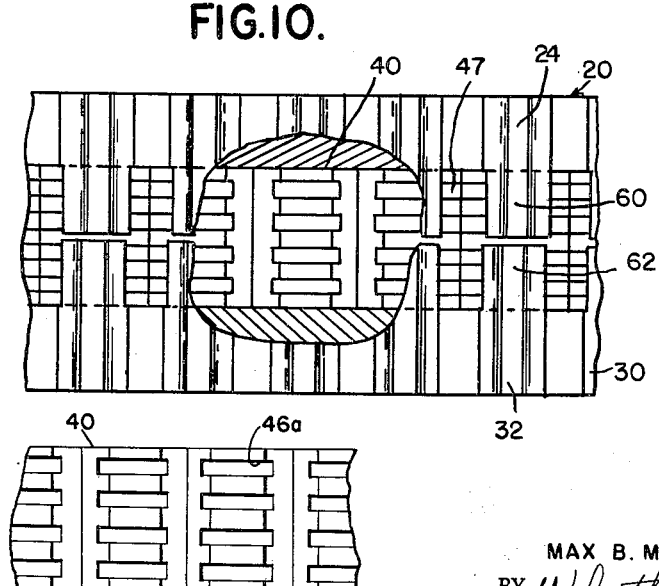
FIG.11.
INVENTOR.
MAX B. MENTLEY
BY Whittemore,
Hulbert & Belknap
ATTORNEYS United States Patent Office 3,008,218
Patented Nov. 14, 1961

3,008,218
GEAR TOOTH CHAMFERING TOOL
Max B. Mentley, Detroit, Mich., assignor to National Broach & Machine Company, Detroit, Mich., a corporation of Michigan
Filed Apr. 22, 1957, Ser. No. 654,214
11 Claims. (Cl. 29—103)

The present invention relates to a gear tooth chamfering tool.

It is an object of the present invention to provide a gear tooth chamfering tool adapted to chamfer the corners of a work gear formed by the intersections between the top and side tooth surfaces thereof.

It is a further object of the present invention to provide a gear tooth chamfering tool which is adjustable to control the depth of chamfer and to control the relative amount of chamfering at opposite corners of the same gear teeth.

It is a further object of the present invention to provide a gear tooth chamfering tool having teeth generally conjugate to the teeth of the work gear to be chamfered and having chamfering cutting portions located at the bottoms of the tooth spaces.

It is a further object of the present invention to provide a tool of the character described in which the chamfering cutting portions comprise cutting edges disposed substantially in the plane of rotation of the tool.

It is a further object of the present invention to provide a tool as defined in the preceding paragraph in which cutting edges in any tooth space are out of alignment with corresponding cutting edges in the next adjacent tooth space.

It is a further object of the present invention to provide a gear tooth chamfering tool comprising a pair of circular coaxial guide bodies having peripheral teeth located in general axial alignment, and a circular cutter body having chamfering cutting portions disposed generally in alignment with the spaces between the teeth of said guide bodies and adjacent the bottom of the tooth spaces.

It is a further object of the present invention to provide a tool as described in the preceding paragraph in which said cutter body is circumferentially adjustable relative to said guide bodies, and preferably in which said guide bodies are circumferentially adjustable relative to each other.

Other objects and features of the invention will become apparent as the description proceeds, especially when taken in conjunction with the accompanying drawings, illustrating a preferred embodiment of the invention, wherein:

FIGURE 1 is a fragmentary elevational view of a tool constructed in accordance with the present invention, with parts broken away.

FIGURE 1A is an enlargement of two teeth of the tool.

FIGURE 1B is an elevational view of a gear tooth chamfered in accordance with the present invention.

FIGURE 2 is a section on the line 2—2, FIGURE 1.

FIGURE 3 is a fragmentary sectional view showing means for effecting circumferential adjustment.

FIGURE 4 is an elevational view of the main guide body.

FIGURE 5 is a sectional view on the line 5—5, FIGURE 4.

FIGURE 6 is an elevational view of the supplemental guide body.

FIGURE 7 is a sectional view on the line 7—7, FIGURE 6.

FIGURE 8 is an elevational view of the serrated cutter body.

FIGURE 9 is a sectional view on the line 9—9, FIGURE 8.

FIGURE 10 is an enlarged edge view of the tool with parts broken away.

FIGURE 11 is a fragmentary diagrammatic view illustrating helically inclined cutting edges.

The present invention relates to a gear chamfering tool designed to chamfer the corners of the teeth 10 of a work gear, as illustrated in FIGURE 1B, the corners being provided by the intersection of the side surfaces 11 and the top surfaces 12 thereof. The chamfer is indicated at 14.

This chamfering operation is accomplished by rolling the work gear in tight mesh with a gear-like tool of special design, the tool having chamfering cutters located in the bottoms of the tooth spaces thereof. The operation may be carried out by driving either the work gear or the tool directly and driving the other of such members through the meshed engagement therebetween. The tool and work gear may be operated on parallel axes, in which case the cutting edges on the chamfering cutter in successive tooth spaces are out of circumferential alignment, or they may be operated on crossed axes by providing a tool having a helix angle different from that of the work gear, in which case the cutting edges may be in circumferential alignment.

The tool comprises a first guide body 20 of circular cross-section, details of which are best illustrated in FIGURES 4 and 5. This guide body is provided with an axially extending tubular hub 22 provided with a keyway 23 therein for the reception of a driving key, and with peripheral teeth 24 the profiles of which are conjugate to the teeth of a work gear. The side of the guide body 20 from which the hub 22 extends is provided with an annular recess 26 the radially outer portion of which is located outwardly of the bottoms of the tooth spaces and intersects the sides or flanks of the gear teeth 24 in lines 27 and 28. The corners of the recess 26 are deepened as indicated at 29.

Mounted on the hub 22 is a second guide body 30 of generally annular shape, details of which are best illustrated in FIGURES 6 and 7. The guide body 30 has a central opening 31 dimensioned to fit closely on the hub 22 of the first guide body. It is also provided with peripheral teeth 32 identical with the teeth 24 of the first guide body. The side of the guide body 30 adjacent the guide body 20 is provided with a circular recess 34 the radially outward portion of which is located beyond the bottoms 35 of the spaces between the teeth 32, thus intersecting the flanks or sides and ends of the teeth 32 as indicated by the lines 36 and 37 respectively.

The chamfering cutter body is indicated at 40, details of which are best illustrated in FIGURES 8 and 9. The cutter body 40 is a flat annular body having a central opening 42 adapted to fit closely on the hub 22 to provide for relative circumferential movement between the cutter body 40 and the hub 22. The radially outer portion of the cutter body 40 is provided with outwardly concave V-shaped notches 44 and the peripheral surface of the cutter body 40 is provided with circumferentially extending grooves 46 leaving parallel intermediate lands 47 therebetween. The corners of the lands form cutting edges extending in the plane of rotation of the tool.

In assembly, as best illustrated in FIGURE 2, the cutter body 40 is received in the recesses 26 and 34 of the guide bodies 20 and 30. The outwardly concave V-shaped notches 44 are located in substantial circumferential alignment with the spaces between the adjacent teeth of the guide bodies and the cutting edges are positioned to intercept the top corners of the work gear and to chamfer them as indicated at 14, in FIGURE 1B.

Reference has been made to the fact that the tool may operate on parallel axes with respect to the work gear or at crossed axes. This depends upon whether or not the helix angle of the tool is designed for either parallel or crossed axes operation. In either case, the cutting edges defined by the corners of the lands 47 of the cutter body extend parallel to the plane of rotation of the tool. If the operation is intended to be performed on parallel axes, the grooves 46 are arranged to extend at a helical angle so that a uniform cutting or chamfering action will be provided at the top corners of the teeth of the work gear. If the operation is carried out at crossed axes, the cutting edges provided at the opposite corners of the lands 47 may all be in circumferential alignment, since the crossed axes operation produces an axial component of relative motion between the teeth of the work gear and the cutting portions of the tool.

Referring now to FIGURES 8–10 it will be observed that if the grooves 46 provided in the cutter body 40 are circumferential so as to occupy a plane strictly perpendicular to the axis of the cutter body, then the cutting edges on each of the teeth formed between the V-shaped notches 44 are disposed in a plurality of circumferentially aligned groups. However, instead of providing a plurality of circumferentially extending grooves 46, helical grooves may be provided as seen at 46a in FIGURE 11, which extend at a slight angle from the plane perpendicular to the axis, in which case the cutting edges on adjacent teeth of the cutter body are out of circumferential alignment. If the helix angle were selected such that the lead was equal to the pitch of the grooves, then no cutting edges on different teeth would be in circumferential alignment. If on the other hand, the helix angle were greater, equivalent for example to a two-start thread, then it will be appreciated that a pair of cutting edges located 180 degrees apart on the body would be in circumferential alignment.

The operation is carried out by rotating the tool and gear in tight mesh at substantial speeds and the depth of cut is controlled by controlling the effective width of the tooth spaces between the teeth 24 and 32, as is best illustrated in FIGURE 1A. An increase in the effective width of the tooth space permits deeper penetration of the top of the teeth of the work gear and accordingly, more removal of stock at the chamfered corners 14.

In order to control the depth of cut, means are provided for effecting accurately controlled relative angular or circumferential adjustment between guide bodies 20 and 30 and the cutter or chamfering body 40. This means is best illustrated in the fragmentary sectional view of FIGURE 3 where a portion of the cutter body 40 is shown as provided with oppositely facing seats 48 and 49. The adjacent portion of one of the guide bodies, as for example the guide body 30, is shown as provided with tapped openings 50 and 52 for the reception of adjusting screws 53 and 54 respectively. Obviously, a slight withdrawal of one of the screws 53 or 54 accompanied by corresponding advance of the other screw effects a slight circumferential adjustment between the guide body and cutter body.

In addition, means are provided for clamping the guide bodies and cutter body together and this means comprises circular bolt receiving openings 56 in the guide body 20 and elongated bolt receiving openings 57 and 58 in the cutter body 40 and the guide body 30 respectively. It will be observed in FIGURE 8 that the cutter body 40 is provided with two pairs of recessed seats 48, 49 at each side thereof, the seats at each side being displaced 180 degrees from each other and the seats at opposite sides being displaced 90 degrees from the next adjacent seat.

As seen in FIGURE 4, the guide body 20 is provided with two pairs of tapped openings 59 for receiving adjusting screws for cooperating with the seats at the adjacent sides of the cutter body.

From the foregoing it will be appreciated that the tool may be adjusted as to the amount of chamfer by effecting relative adjustment between the guide bodies 20 and 30 to widen or narrow the effective tooth space. At the same time, the adjustment is accomplished relative to the cutter body so that the bottom of the V-notch 44 of the cutter body may be centrally located with respect to the effective tooth space provided by the guide bodies. Incidentally, the foregoing also provides the possibility if desired, of chamfering only one of the corners of the teeth of the work gear or of effecting different amounts of chamfering at opposite sides of the teeth thereof.

In FIGURE 10 it will be observed that the assembled arrangement of guide bodies and cutter body exposes the lands 47 of the cutter body centrally of the tooth spaces between the teeth defined by the teeth 24 of the guide body 20 and the teeth 32 of the guide body 30. It will also be observed that tooth portions 60 and 62 are provided by the construction in the same plane of rotation occupied by the cutter body to provide accurate guiding relation between the tooth portions of the tool and the teeth of the work gear.

The drawings and the foregoing specification constitute a description of the improved gear tooth chamfering tool in such full, clear, concise and exact terms as to enable any person skilled in the art to practice the invention, the scope of which is indicated by the appended claims.

What I claim as my invention is:

1. A rotary gear tooth chamfering tool for chamfering the corners formed at the intersection of the sides and tops of the teeth of a work gear, said tool comprising a generally cylindrical chamfering cutter body having its periphery formed with circumferentially spaced recesses provided with cutting edges and extending transversely across the periphery of said body, said recesses being spaced apart a distance approximately equal to the circular pitch of a work gear so that successive recesses receive the crests of successive teeth when the body and work gear are rotated together, said tool including guide means connected to said cutter body and comprising gear teeth disposed relative to said cutter body to position one of said recesses adjacent the bottom of each of the spaces between each pair of teeth, said teeth having smooth flanks conjugate to the teeth of a gear to be chamfered to limit and control the depth of chamfer.

2. A gear chamfering tool comprising a pair of co-axial gear-like guide members, having the tooth portions thereof in substantial but not necessarily exact axial registration, adjustable means connecting said guide members for limited circumferential relative adjustment between said members to vary the effective width of the tooth spaces between adjacent pairs of tooth portions, means extending between said members for effecting such relative adjustment thereof, and chamfering means comprising a body of generally cylindrical shape connected to said guide members and having radially outwardly concave chamfering recesses provided with cutting edges, one of which recesses is exposed in the bottom of each of the said tooth spaces.

3. A tool as defined in claim 1 in which said recesses are provided with cutting edges.

4. A tool as defined in claim 1 in which said recesses are provided with cutting edges disposed parallel to the plane of said cutter body.

5. A tool as defined in claim 1 in which said recesses are provided with cutting edges disposed to extend at a small helix angle.

6. A tool as defined in claim 1 in which said guide members are circumferentially adjustable relative to said cutter body.

7. A tool as defined in claim 1 in which said guide members are independently circumferentially adjustable relative to said cutter body.

8. A gear chamfering tool comprising a generally cylindrical guide body having a hub extending axially therefrom, gear teeth at its periphery and an annular recess in the side of said body from which said hub extends, a generally annular chamfering cutter body on said hub and partially received in the annular recess in said guide body, said cutter body having its periphery formed with circumferentially spaced recesses extending transversely across the cutter body and spaced apart a distance approximately equal to the circular pitch of a work gear whose teeth are to be chamfered, an annular guide body on said hub having peripheral gear teeth, said annular guide body having a generally circular recess in the side thereof adjacent said cutter body in which a portion of said cutter body is received, the peripheral recessed portions of said cutter body being exposed in the spaces between the gear teeth of said guide bodies adjacent the bottom thereof.

9. A tool as defined in claim 8 comprising means for effecting relative circumferential adjustment between said cutter body and said guide bodies.

10. A tool as defined in claim 8 comprising means for effecting relative circumferential adjustment between said cutter body and each of said guide bodies.

11. A tool as defined in claim 8 in which the adjacent ends of the teeth of said guide bodies are closely spaced.

References Cited in the file of this patent

UNITED STATES PATENTS

| | | |
|---|---|---|
| 2,167,146 | Drader | July 25, 1939 |
| 2,206,443 | Barter et al. | July 2, 1940 |
| 2,228,968 | Miller | Jan. 14, 1941 |
| 2,248,168 | Gleason | July 8, 1941 |
| 2,278,300 | Barter | Mar. 31, 1942 |
| 2,298,471 | Drummond | Oct. 13, 1942 |
| 2,305,145 | Dalzen | Dec. 15, 1942 |
| 2,310,826 | Adams | Feb. 9, 1943 |
| 2,411,784 | Goldsmith | Nov. 26, 1946 |
| 2,422,404 | Goehle | June 17, 1947 |
| 2,683,399 | Dodge | July 13, 1954 |

FOREIGN PATENTS

| | | |
|---|---|---|
| 740,422 | Germany | Oct. 23, 1943 |
| 392,385 | Great Britain | Apr. 18, 1933 |